United States Patent
Husemann et al.

(10) Patent No.: US 7,410,694 B2
(45) Date of Patent: Aug. 12, 2008

(54) ADHESIVE

(75) Inventors: Marc Husemann, Hamburg (DE); Stephan Zollner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 485 days.

(21) Appl. No.: 11/103,285

(22) Filed: Apr. 11, 2005

(65) Prior Publication Data

US 2006/0228545 A1   Oct. 12, 2006

(51) Int. Cl.
  *B32B 7/12*   (2006.01)
(52) U.S. Cl. ............................. 428/355 AC; 526/931; 526/935
(58) Field of Classification Search .............. 428/343, 428/345, 355 R, 355 EP, 355 EN, 355 AC; 522/35, 113, 114, 120, 121, 152; 526/931, 526/935
  See application file for complete search history.

(56) References Cited

U.S. PATENT DOCUMENTS

| | | | |
|---|---|---|---|
| 4,222,928 A | 9/1980 | Kawamura et al. | 260/40 |
| 4,581,429 A | 4/1986 | Solomon et al. | 526/220 |
| 5,086,088 A | 2/1992 | Kitano et al. | 522/170 |
| 5,608,023 A | 3/1997 | Odell et al. | 526/225 |
| 5,723,191 A * | 3/1998 | Plamthottam et al. | 428/41.8 |
| 5,767,210 A | 6/1998 | Lecomte et al. | 526/166 |
| 5,789,487 A | 8/1998 | Matyjaszewski et al. | 525/301 |
| 5,811,500 A | 9/1998 | Dubois et al. | 526/145 |
| 5,854,364 A | 12/1998 | Senninger et al. | 526/192 |
| 5,919,871 A | 7/1999 | Nicol et al. | 525/333.8 |
| 5,945,491 A | 8/1999 | Matyjaszewski et al. | 526/111 |
| 6,114,482 A | 9/2000 | Senninger et al. | 526/172 |
| 6,281,311 B1 | 8/2001 | Lai et al. | 526/220 |
| 6,432,529 B1 | 8/2002 | Harder et al. | 428/355 |
| 6,642,318 B1 | 11/2003 | Chiefari et al. | 525/261 |
| 6,645,617 B1 * | 11/2003 | Okazaki et al. | 428/343 |
| 2003/0125494 A1 | 7/2003 | Nesvadba et al. | 526/328.5 |
| 2003/0216513 A1 | 11/2003 | Righettini et al. | 525/107 |
| 2004/0054081 A1 | 3/2004 | Husemann et al. | 525/123 |
| 2004/0171777 A1 | 9/2004 | Le et al. | 526/286 |

FOREIGN PATENT DOCUMENTS

| | | |
|---|---|---|
| DE | 198 07 752 | 8/1999 |
| DE | 199 49 352 A1 | 4/2000 |
| DE | 100 44 374 | 8/2002 |
| DE | 102 12 831 | 10/2003 |
| DE | 102 21 275 | 11/2003 |
| DE | 102 21 278 | 11/2003 |
| EP | 0 735 052 A1 | 10/1996 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| WO | WO 96/24620 A1 | 8/1996 |
| WO | WO 98/01478 | 1/1998 |
| WO | WO 98/13392 A1 | 4/1998 |
| WO | WO 98/44008 A1 | 10/1998 |
| WO | WO 99/31144 | 6/1999 |

OTHER PUBLICATIONS

D. Satas, Handbook of Pressure Sensitive Adhesive Technology, 1989, 2nd Edition, Van Nostrand Reinhold, New York.
T. G. Fox, Bull. Am. Phys. Soc. 1 (1956) 123.
Houben-Weyl, Methoden der Organischen Chemie, vol. E19a, p. 60-147.
Macromolecules, 1995, 28, 7886.
Macromolecules, 2000, 33, 243-245.
Fouassier: "Photoinitiation, Photopolymerization and Photocuring: Fundamentals and Applications", Hanser-Verlag, Munich 1995.
Carroy et al. in "Chemistry and Technology of UV and EB Formulation for Coatings, Inks and Paints", Oldring (ed.), 1994, SITA, London.
Skelhorne, Electron Beam Processing, in Chemistry and Technology of UV and EB Formulation for Coatings, Inks and Paints, vol. 1, 1991, SITA, London.

* cited by examiner

*Primary Examiner*—Thao Tran
(74) *Attorney, Agent, or Firm*—Norris McLaughlin & Marcus PA

(57) ABSTRACT

The invention relates to an adhesive. Provision is made for the adhesive to comprise
(a) 50 to 95% by weight of a heat-activable or pressure-sensitively adhesive polymer formed from a comonomer mixture comprising, based on the polymer,
  (a1) 40 to 95% by weight of acrylic and/or methacrylic esters of the formula $CH_2=CH(R_1)(COOR_2)$, where $R_1$ is H and/or $CH_3$ and $R_2$ is H and/or alkyl chains having 1 to 30 carbon atoms;
  (a2) 5 to 30% by weight of a first copolymerizable vinyl monomer containing at least one carboxylic and/or sulphonic and/or phosphonic acid group;
  (a3) 1 to 10% by weight of a second copolymerizable vinyl monomer containing at least one epoxy group or one acid anhydride function; and
  (a4) 0 to 20% by weight of a third copolymerizable vinyl monomer containing at least one functional group which differs from the functional group of the first copolymerizable vinyl monomer and from the functional group of the second copolymerizable vinyl monomer; and also
(b) 5 to 50% by weight of an epoxy resin or a mixture of two or more epoxy resins.

12 Claims, No Drawings

ADHESIVE

BACKGROUND OF THE INVENTION

The invention relates to an adhesive and to its use for an adhesive tape.

For industrial pressure-sensitive adhesive (PSA) tape applications it is very common to use adhesive tapes, which are required to withstand high temperatures. Some of the applications to which this applies are in the automotive sector. In that sector, particularly in the vicinity of the engine compartment, adhesive tapes are affected with particular severity by sharply fluctuating temperatures and by fuels. These properties are possessed in a very good form by crosslinked acrylate PSAs.

Additionally a very wide variety of substrates in the industrial sector may likewise be adhesively bonded. Here it may in some cases be of advantage to use heat-activable adhesives, which above a certain temperature soften, flow very effectively onto the substrates and then cool to form a solid bond.

In addition to the adhesive tapes already described there is an increasing demand—owing to more stringent environmental regulations, particularly for manufacturing—for particularly environment-friendly adhesive tapes which exhibit very little outgassing or none at all.

In order to achieve this for the requirements in the automotive industry, for example, two technologies are required for acrylate adhesive tapes. First the adhesive tapes ought not to contain resins, since resins evaporate out under prolonged temperature storage and so form deposits in the surrounding area. Secondly the adhesives ought to be prepared by the hotmelt technology: following polymerization, all of the remaining solvents and residual monomers are removed or stripped off and then the adhesive is crosslinked on the backing.

To date it is not proved possible to fulfil all of these requirements on the part of industry. U.S. Pat. No. 5,086,088, for example, describes thermally activable adhesives, and these adhesives on the one hand do not meet the requirements for low outgassing, owing to their composition and to the use of UV polymerization technology, and on the other hand cannot be processed from the melt, owing to the thermal curing agent present, since the thermal crosslinking reaction would be initiated even in the course of hotmelt processing.

It is an object of the invention to eliminate the disadvantages associated with the prior art. The intention is in particular to specify an adhesive which exhibits low outgassing and is fuel-resistant, which can be postcrosslinked under high temperatures, develops relatively high bond strengths and can be processed even from the melt. The intention is further to specify a use for an adhesive of this kind.

SUMMARY OF THE INVENTION

The invention provides an adhesive which, based on the adhesive, comprises (a) 50 to 95% by weight of a heat-activable or pressure-sensitively adhesive polymer formed from a comonomer mixture comprising, based on the polymer, (a1) 40 to 95% by weight of acrylic and/or methacrylic esters of the formula $CH_2\!\!=\!\!CH(R_1)(COOR_2)$, where $R_1$ is H and/or $CH_3$ and $R_2$ is H and/or alkyl chains having 1 to 30 carbon atoms;

(a2) 5 to 30% by weight of a first copolymerizable vinyl monomer containing at least one carboxylic and/or sulphonic and/or phosphonic acid group;

(a3) 1 to 10% by weight of a second copolymerizable vinyl monomer containing at least one epoxy group or one acid anhydride function; and (a4) 0 to 20% by weight of a third copolymerizable vinyl monomer containing at least one functional group which differs from the functional group of the first copolymerizable vinyl monomer and from the functional group of the second copolymerizable vinyl monomer; and also (b) 5 to 50% by weight of an epoxy resin or a mixture of two or more epoxy resins.

Surprisingly it has been found that the adhesive of the invention meets the abovementioned requirements to outstanding effect.

DETAILED DESCRIPTION

Depending on whether component (a) is a heat-activable or pressure-sensitively adhesive polymer the adhesive of the invention is a heat-activable or pressure-sensitive adhesive. Preferably the adhesive of the invention is a heat-activable adhesive.

The third copolymerizable vinyl monomer (component (a4)) ought to contain a functional group which is able to contribute to raising the cohesion, to increasing the crosslinking reactivity or to direct crosslinking.

In the text below, components (a1), (a2), (a3) and (a4) are also referred to as monomers (a1), (a2), (a3) and (a4). Component (a) is also referred to as polymer (a) or polymer, bearing in mind that the polymer itself already constitutes an adhesive or PSA.

The polymer, processes for preparing the polymer, component (b) and processes for preparing the adhesive of the invention from component (a) and component (b) are elucidated in greater detail below.

Polymer (a)

The polymer (a) may comprise a heat-activable PSA which acquires its pressure-sensitive adhesion on temperature exposure under optional pressure and which after bonding and cooling develops a high bond strength as a result of solidification. Depending on the application temperature these heat-activable PSAs have different static glass transition temperatures $T_{G,A}$ or melting points $T_{S,A}$.

In one very preferred embodiment the monomers used for (a1) are acrylic monomers, which comprise acrylic and methacrylic esters with alkyl groups composed of 4 to 14 carbon atoms, preferably 4 to 9 carbon atoms. Specific examples, without wishing to be restricted by this recitation, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate and the branched isomers thereof, such as 2-ethylhexyl acrylate.

Further classes of compounds which may likewise be added in small amounts under (a1) are methyl methacrylates, cyclohexyl methacrylates, isobornyl acrylate and isobornyl methacrylates.

In one preferred form monomers used for (a2) comprise itaconic acid, acrylic acid, methacrylic acid, vinylacetic acid, fumaric acid, crotonic acid, aconitic acid, dimethylacrylic acid, β-acryloyloxypropionic acid, trichloroacrylic acid, vinylphosphonic acid and vinylsulphonic acid.

In one preferred form monomers used for (a3) include glycidyl methacrylate, maleic anhydride and itaconic anhydride.

In one very preferred embodiment monomers used for (a4) include vinyl esters, vinyl ethers, vinyl halides, vinylidene halides, vinyl compounds containing aromatic rings and heterocycles in a position. Here as well mention may be made, non-exclusively, of some examples: vinyl acetate, vinylformamide, vinylpyridine, ethyl vinyl ether, vinyl chloride, vinylidene chloride and acrylonitrile.

In one further very preferred embodiment use is made for component (a4) of monomers containing the following functional groups: hydroxy, acid amide, isocyanato or amine groups.

Further particularly preferred examples for component (a4) are hydroxyethyl acrylate, hydroxypropyl acrylate, hydroxyethyl methacrylate, hydroxypropyl methacrylate, allyl alcohol, acrylamide, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide and tetrahydrofurfuryl acrylate, this recitation not being conclusive.

In a further preferred embodiment use is made for component (a4) of aromatic vinyl compounds, it being possible for the aromatic nuclei to be composed preferably of $C_4$ to $C_{18}$ and also to contain heteroatoms. Particularly preferred examples are styrene, 4-vinylpyridine, N-vinylphthalimide, methylstyrene, 3,4-dimethoxystyrene and 4-vinylbenzoic acid, this recitation not being conclusive.

For polymerization the monomers are in turn chosen such that the resultant polymers can be used as industrial adhesives or PSAs, especially such that the resultant polymers possess adhesive or PSA properties in accordance with the "Handbook of Pressure Sensitive Adhesive Technology" by Donatas Satas (van Nostrand, New York 1989). Here as well it is possible to control the desired glass transition temperature through the use of the Fox Equation (G1) when putting together the monomer mixture on which the polymerization is based. For PSAs the static glass transition temperature of the resulting polymer is advantageously below 15° C.

In order to obtain a glass transition temperature $T_{G,A}$ of the polymers of $T_{G,A} \geqq 30°$ C. for heat-activable adhesives the monomers, in accordance with the details given above, are very preferably selected, and the quantitative composition of the monomer mixture advantageously chosen, such that the Fox Equation (G1) (cf. T. G. Fox, Bull. Am. Phys. Soc. 1 (1956) 123) results in the desired $T_{G,A}$ value for the polymer.

$$\frac{1}{T_G} \sum_n \frac{w_n}{T_{G,n}} \quad (G1)$$

In this equation n represents the serial number of the monomers used, $w_n$ the mass fraction of the respective monomer n (% by weight) and $T_{G,n}$ the respective glass transition temperature of the homopolymer of the respective monomer n, in K.

To prepare the polymers it is advantageous to carry out conventional radical polymerizations or controlled radical polymerizations. For the polymerizations which proceed by a radical mechanism it is preferred to use initiator systems further comprising further radical initiators for the polymerization, especially thermally decomposing radical-forming azo or peroxo initiators. In principle, however, all customary initiators familiar to the person skilled in the art for acrylates are suitable. The production of C-centred radicals is described in Houben-Weyl, Methoden der Organischen Chemie, Vol. E 19a, pp. 60-147. These methods are preferentially employed analogously.

Examples of radical sources are peroxides, hydroperoxides and azo compounds. Examples of typical radical initiators are potassium peroxodisulphate, dibenzoyl peroxide, cumene hydroperoxide, cyclohexanone peroxide, di-t-butyl peroxide, azodiisobutyronitrile, cyclohexylsulphonyl acetyl peroxide, diisopropyl percarbonate, t-butyl peroctoate and benzpinacol, this recitation not being conclusive. In one very preferred embodiment a radical initiator used is 1,1'-azobis(cyclohexanecarbonitrile) (Vazo 88™ from DuPont).

The average molecular weights $M_n$ of the PSAs arising from the radical polymerization are very preferably chosen such that they are situated within a range from 20 000 to 2000 000 g/mol; specifically for further use as hotmelt PSAs, PSAs are prepared having average molecular weights Mn of from 100 000 to 500 000 g/mol. The average molecular weight is determined by size exclusion chromatography (SEC) or matrix-assisted laser desorption/ionization mass spectrometry (MALDI-MS).

The polymerization can be conducted in bulk, in the presence of one or more organic solvents, in the presence of water or in mixtures of organic solvents and water. The aim is to minimize the amount of solvent used. Suitable organic solvents are pure alkanes (e.g. hexane, heptane, octane, isooctane), aromatic hydrocarbons (e.g. benzene, toluene, xylene), esters (e.g. ethyl, propyl, butyl or hexyl acetate), halogenated hydrocarbons (e.g. chlorobenzene), alkanols (e.g. methanol, ethanol, ethylene glycol, ethylene glycol monomethyl ether) and ethers (e.g. diethyl ether, dibutyl ether) or mixtures thereof. A water-miscible or hydrophilic cosolvent can be added to the aqueous polymerization reactions in order to ensure that in the course of monomer conversion the reaction mixture is present in the form of a homogeneous phase. Cosolvents which can be used with advantage for the present invention are selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulphides, sulphoxides, sulphones, alcohol derivatives, hydroxy ether derivatives, amino alcohols, ketones and the like, and also derivatives and mixtures thereof.

Depending on conversion and temperature the polymerization takes between 4 and 72 hours. The higher the reaction temperature can be chosen, i.e. the higher the thermal stability of the reaction mixture, the lower the reaction time that can be chosen.

In order to initiate the polymerization it is essential to introduce heat for the thermally decomposing initiators. For the thermally decomposing initiators the polymerization can be initiated by heating to from 50 to 160° C., depending on initiator type.

In an advantageous procedure radical stabilization is effected using nitroxides of type (NIT 1) or (NIT 2):

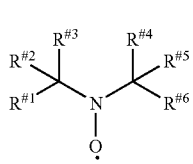
(NIT 1)

-continued

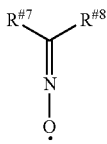
(NIT 2)

where $R^{\#1}$, $R^{\#2}$, $R^{\#3}$, $R^{\#4}$, $R^{\#5}$, $R^{\#6}$, $R^{\#7}$ and $R^{\#8}$ independently of one another denote the following compounds or atoms:
i) halides, such as chlorine, bromine or iodide, for example;
ii) linear, branched, cyclic and heterocyclic hydrocarbons having 1 to 20 carbon atoms, which can be saturated, unsaturated or aromatic;
iii) esters —COOR$^{\#9}$, alkoxides —OR$^{\#10}$ and/or phosphonates —PO(OR$^{\#11}$)$_2$, where R$^{\#9}$, R$^{\#10}$ and/or R$^{\#11}$ stand for radicals from group ii).

Compounds of the structure (NIT 1) or (NIT 2) can also be attached to polymer chains of whatever kind (in which case it is preferred for at least one of the abovementioned radicals to represent such a polymer chain) and can therefore be utilized for the synthesis of block copolymers, as macroradicals or macroregulators.

Of greater preference as controlled regulators for the polymerization are compounds of the following type:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL
2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl
N-tert-butyl 1-phenyl-2-methylpropyl nitroxide
N-tert-butyl 1-(2-naphtyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl) 1-diethylphosphono-1-methylethyl nitroxide
di-t-butyl nitroxide
diphenyl nitroxide
t-butyl t-amyl nitroxide.

A series of further polymerization methods by which the adhesives can be prepared alternatively may be selected from the state of the art:

U.S. Pat. No. 4,581,429 A discloses a controlled-growth radical polymerization process which uses as initiator a compound of the formula R'R"N—O—Y, in which Y is a free radical species which is able to polymerize unsaturated monomers. The reactions, however, generally have low conversions. A particular problem is the polymerization of acrylates, which runs only to very low yields and molar masses. WO 98/13392 A1 described open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds, such as phosphorus-containing nitroxides, for example, based on imidazolidine, are used. WO 98/44008 A1 discloses specific nitroxyls based on morpholines, piperazinones and piperazinediones. DE 199 49 352 A1 discloses heterocyclic alkoxyamines as regulators in controlled-growth radical polymerizations. Corresponding further developments of the alkoxyamines or of the corresponding free nitroxides improve the efficiency for the preparation of polyacrylates (Hawker, paper at the National Meeting of the American Chemical Society, Spring 1997; Husemann, paper to the IUPAC World-Polymer Meeting 1998, Gold Coast).

Another controlled polymerization method which can be used advantageously to synthesize block copolymers is atom transfer radical polymerization (ATRP), in which the initiator used preferably comprises monofunctional or difunctional secondary or tertiary halides and, to abstract the halide(s), complexes of Cu, Ni, Fe, Pd, Pt, Ru, Os, Rh, Co, Ir, Ag or Au (EP 0 824 111 A1; EP 826 698 A1; EP824 110 A1; EP 841 346 A1; EP 850 957 A1). The different possibilities of ATRP are described further in U.S. Pat. No. 5,945,491 A, U.S. Pat. No. 5,854,364 A and U.S. Pat. No. 5,789,487 A.

With further advantage the polymer used in accordance with the invention can be prepared via anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, where Me is a metal from group I of the Periodic Table, such as lithium, sodium or potassium, and $P_L(A)$ is a growing polymer block of the monomers [a1) to a4)]. The molar mass of the polymer under preparation is determined by the ratio of initiator concentration to monomer concentration.

Examples of suitable polymerization initiators include n-propyllithium, n-butyllithium, sec-butyllithium, 2-naphthyllithium, cyclohexyllithium and octyllithium, this recitation making no claim to completeness. Additionally, initiators based on samarium complexes are known for the polymerization of acrylates (Macromolecules, 1995, 28, 7886) and can be employed here.

It is also possible, moreover, to use difunctional initiators, such as 1,1,4,4-tetraphenyl-1,4-dilithiobutane or 1,1,4,4-tetraphenyl-1,4-dilithioisobutane, for example. Coinitiators may likewise be employed. Suitable coinitiators include lithium halides, alkali metal alkoxides or alkylaluminium compounds. In one very preferred version the ligands and coinitiators are chosen so that acrylate monomers, such as n-butyl acrylate and 2-ethylhexyl acrylate, for example, can be polymerized directly and do not have to be generated in the polymer by transesterification with the corresponding alcohol.

A very preferred preparation process conducted is a variant of the RAFT (reversible addition-fragmentation chain transfer) polymerisation. The polymerization process is described in detail in, for example, publications WO 98/01478 A1 and WO 99/31144 A1. Suitable with particular advantage for the preparation are trithiocarbonates of the general structure R'''—S—C(S)—S—R''' (Macromolecules 2000, 33, 243-245).

In one very advantageous version, for example, the trithiocarbonates (TTC1) and (TTC2) or the thio compounds (THI1) and (THI2) are used for the polymerization, it being possible for Φ to be a phenyl ring, which can be unfunctionalized or functionalized by alkyl or aryl substituents attached directly or via ester or ether bridges, or to be a cyano group, or to be a saturated or unsaturated aliphatic radical. The phenyl ring Φ may optionally carry one or more polymer blocks, examples being polybutadiene, polyisoprene, polychloroprene or poly(meth)acrylate, which can be constructed in accordance with the definition of P(A) or P(B), or may carry polystyrene, to name but a few. Functionalizations may be, for example, halogens, hydroxyl groups, epoxide groups, groups containing nitrogen or sulphur, without this list making any claim to completeness.

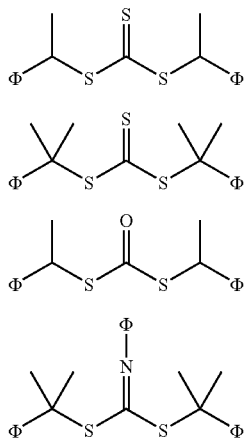

(TTC 1)

(TTC 2)

(THI 1)

(THI 2)

It is also possible to employ thioesters of the general structure

(THE)

particularly in order to prepare asymmetric systems. $R^{\$1}$ and $R^{\$2}$ can be chosen independently of one another, it being possible for $R^{\$1}$ to be a radical from one of the following groups i) to iv) and $R^{\$2}$ to be a radical from one of the following groups i) to iii):
i) $C_1$ to $C_{18}$ alkyl, $C_2$ to $C_{18}$ alkenyl, $C_2$ to $C_{18}$ alkynyl, each linear or branched; aryl, phenyl, benzyl, aliphatic and aromatic heterocycles;
ii) —$NH_2$, —NH—$R^{\$3}$, —$NR^{\$3}R^{\$4}$, —NH—C(O)—$R^{\$3}$, —$NR^{\$3}$—C(O)—$R^{\$4}$, —NH—C(S)—$R^{\$3}$, —$NR^{\$3}$—C(S)—$R^{\$4}$,

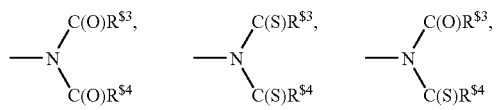

where $R^{\$3}$ and $R^{\$4}$ are radicals chosen independently of one another from group i);
iii) —S—$R^{\$5}$, —S—C(S)—$R^{\$5}$, it being possible for $R^{\$5}$ to be a radical from one of groups i) and ii);
iv) —O—$R^{\$6}$, —O—C(O)—$R^{\$6}$, it being possible for $R^{\$6}$ to be a radical from one of groups i) and ii).

In conjunction with the abovementioned controlled-growth radical polymerizations it is preferred to use initiator systems further comprising additional radical initiators for the polymerization, especially thermally decomposing radical-forming azo or peroxo initiators. In principle, however, all customary initiators known for acrylates are suitable for this purpose. The production of C-centred radicals is described in Houben-Weyl, Methoden der Organischen Chemie, Vol. E19a, p. 60ff. These methods are employed preferentially. Examples of radical sources are peroxides, hydroperoxides and azo compounds. Examples of typical radical initiators that may be mentioned here include potassium peroxodisulphate, dibenzoyl peroxide, cumene hydroperoxide, cyclohexanone peroxide, cyclohexylsulphonyl acetyl peroxide, di-tert-butyl peroxide, azodiisobutyronitrile, diisopropyl percarbonate, tert-butyl peroctoate and benzpinacol, the recitation not being conclusive. In one very preferred variant the radical initiator used is 1,1'-azobis(cyclohexanenitrile) (Vazo 88®, DuPont®) or 2,2-azobis(2-methylbutanenitrile) (Vazo 67®, DuPont®). In addition it is also possible to use radical sources which release radicals only under UV irradiation.

In the conventional RAFT process polymerization is generally carried out only to low conversions (WO 98/01478 A1) in order to produce molecular weight distributions which are as narrow as possible. As a result of the low conversions, however, these polymers cannot be used as PSAs and in particular not as hotmelt PSAs, since the high fraction of residue monomers adversely affects the technical adhesive properties, the residue monomers contaminate the solvent recyclate in the concentration process, and the corresponding self-adhesive tapes would exhibit a very high level of outgassing.

Epoxy Resins (b)

The epoxy resins described in this patent embrace the entire group of epoxy compounds. Thus the epoxy resins may be monomers, oligomers or polymers. Polymeric epoxy resins may be aliphatic, cycloaliphatic, aromatic or heterocyclic in nature. The epoxy resins preferably have at least 2 epoxy groups which can be utilized for crosslinking.

The molecular weight of the epoxy resins varies from 100 g/mol up to a maximum of 25 000 g/mol for polymeric epoxy resins.

The epoxy resins include, for example, the reaction product of bisphenol A and epichlorohydrin, the reaction product of phenol and formaldehyde (novolak resins) and epichlorohydrin, glycidyl esters, and the reaction product of epichlorohydrin and p-aminophenol.

Preferred commercial examples include Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071 and HPT™ 1079, likewise from Shell Chemical.

Examples of commercial aliphatic epoxy resins include vinylcyclohexane dioxides, such as ERL-4206, ERL-4221, ERL 4201, ERL-4289 or ERL-0400 from Union Carbide Corp.

In one possible embodiment the inventive adhesive comprises further formulating ingredients, such as, for example, fillers, pigments, rheological additives, additives for improving adhesion, plasticizers, elastomers, ageing inhibitors (antioxidants), light stabilizers, UV absorbers and other auxiliaries and additives, such as dryers (for example molecular sieve zeolites, calcium oxide), flow and levelling agents, wetting agents (surfactants) or catalysts, for example.

As fillers it is possible to employ any finely ground solid additives such as, for example, chalk, magnesium carbonate, zinc carbonate, kaolin, barium sulphate, titanium dioxide or calcium oxide. Further examples are talc, mica, silica, silicates or zinc oxide. Mixtures of the substances stated may also be used.

The pigments used may be organic or inorganic in nature. All kinds of organic and inorganic colour pigments are suitable, examples being white pigments such as titanium dioxide, for instance, for enhancing the light stability and UV stability, and also metal pigments.

Examples of rheological additives are pyrogenic silicas, phyllosilicates (bentonites), high molecular mass polyamide powders or castor oil derivative powders.

Additives for improving the adhesion may be, for example, substances from the groups of the polyamides, epoxides or silanes.

Examples of plasticizers are phthalates, trimellitates, phosphates, esters of adipic acid, and other acyclic dicarboxylic esters, fatty acid esters, hydroxycarboxylic esters, alkylsulphonic esters of phenol, aliphatic, cycloaliphatic and aromatic mineral oils, hydrocarbons, liquid or semisolid rubbers (for example nitrile or polyisoprene rubbers), liquid or semisolid polymers of butene and/or isobutene, acrylates, polyvinyl ethers, liquid resins and soft resins based on the raw materials which also constitute the basis of tackifier resins, wool wax and other waxes, silicones, and polymer plasticizers such as polyesters or polyurethanes, for instance.

Suitable resins are all natural and synthetic resins, such as rosin derivatives (derivatives formed for example by disproportionation, hydrogenation or esterification), coumarone-indene resins and polyterpene resins, aliphatic or aromatic hydrocarbon resins (C-5, C-9 and (C-5)$_2$ resins), mixed C-5/C-9 resins, fully and partly hydrogenated derivatives of the type stated, resins of styrene or α-methylstyrene, and also terpene-phenolic resins and others as listed in Ullmanns Enzyklopadie der technischen Chemie (4th ed.), Volume 12, pp. 525-555, Weinheim.

Examples of suitable elastomers include EPDM rubber or EPM rubber, polyisobutylene, butyl rubber, ethylene-vinyl acetate, hydrogenated block copolymers of dienes (for example, by hydrogenation of SBR, cSBR, BAN, NBR, SBS, SIS or IR; such polymers are known, for example, as SEPS and SEBS) or acrylate copolymers such as ACM.

The formulation of the adhesive of the invention with further constituents, such as fillers and plasticizers, for example, is likewise state of the art.

The adhesive can be prepared by a variety of methods, some of which are described below.

The adhesives can be applied directly, by an indirect transfer method, by coextrusion, from solution, dispersion or the melt.

In accordance with the method of application the polymer (a) is blended with the epoxy resin or resins (b). For coating from solution it is preferred to add the epoxy resin (b) in solution to the polymer (a) and to incorporate it by stirring. For this purpose it is possible to use any of the stirring technologies known to the skilled person. Additionally it is possible to prepare a homogeneous mixture by using static or dynamic mixing equipment.

For coating from the melt the solvent is preferably stripped off under reduced pressure in a concentrating extruder, for which, for example, single-screw or twin-screw extruders can be used which preferentially distil off the solvent in different or identical vacuum stages and possess a feed preheater. In one preferred embodiment the residual solvent content is below 1% by weight, very preferably below 0.5% by weight.

Blending with the epoxy resins (b) is preferably likewise undertaken in the melt. For that purpose it is possible to employ kneading apparatus or again twin-screw extruders. Blending is preferably carried out hot, but at well below the activation temperature for the reaction of the epoxy resins (b) with the polymer (a) in the mixing equipment.

For optional crosslinking with UV light the adhesives have UV-absorbing photoinitiators added to them. Useful photoinitiators whose use is very effective are benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone, dimethoxyhydroxyacetophenone, substituted α-ketols, such as 2-methoxy-2-hydroxypropiophenone, aromatic sulphonyl chlorides, such as 2-naphthylsulphonyl chloride, and photoactive oximes, such as 1-phenyl-1,2-propanedione 2-(O-ethoxycarbonyl) oxime, for example.

The photoinitiators mentioned above and others which can be used, and others of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexaarylbisimidazole, triazine, or fluorenone radicals, it being possible for each of these radicals to be additionally substituted by one or more halogen atoms and/or one or more alkoxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, Carroy et al. in "Chemistry and Technology of UV and EB Formulation for Coatings, Inks and Paints", Oldring (Ed.), 1994, SITA, London, can be consulted.

In principle it is also possible to crosslink the adhesives of the invention using electron beams. Typical irradiation apparatus which may be employed includes linear cathode systems, scanner systems and segmented cathode systems, where the equipment in question comprises electron beam accelerators. A detailed description of the state of the art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are in the range between 50 kV and 500 kV, preferably between 80 kV and 300 kV. The scatter doses employed range between 5 to 150 kGy, in particular between 20 and 100 kGy.

Finally the invention provides for the use of the above-described adhesives for a single-sided or double-sided adhesive tape composed of at least one backing and a layer of a pressure-sensitive adhesive.

Backing materials used for the adhesive, for adhesive tapes for example, are the customary materials which are familiar to those skilled in the art, such as films (polyester, PET, PE, PP, BOPP, PVC, polyimide), nonwovens, foams, wovens and woven films, and release paper (Glassine, HDPE, LDPE). Coating may also take place onto metal foils, such as aluminium or copper, for example. In another embodiment the adhesive is used to produce laminates of polyimide and copper foils. This recitation is not conclusive.

EXAMPLES

Test Methods

A. T-Peel Test with FPCB

The adhesive sheet is laminated onto the polyimide film of the polyimide/copper foil laminate (an FPCB, standing for Flexible Printed Circuit Board) at 100° C. Subsequently this operation is repeated with a second polyimide film so as to produce a joint between two polyimide/copper film laminates, the polyimide films being bonded to one another in each case. The assembly is cured by subjecting it to compression in a heatable press from Bürkle at 170° C. for 30 minutes under a pressure of 50 N/cm$^2$.

Subsequently the assembly is pulled apart at a peel angle of 180° and a speed of 50 mm/min, using a tensile testing machine from Zwick, and the force in N/cm is measured. The measurement is carried out at 20° C. under 50% humidity. The measurements are made three times and averaged.

B. Solder Bath Resistance

An FPCB assembly bonded with the examples according to test method A is immersed completely for 10 seconds in a solder bath at 288° C. The bond is considered solder bath resistant if no air bubbles are formed which cause the polyimide film of the FPCB to expand. The test is failed if even slight bubble formation occurs.

C. Bonding Strength

The bonding strength was measured in analogy to DIN EN 1465. The measurements are reported in N/mm$^2$.

D. Bond Strength

The peel strength (bond strength) was tested in accordance with PSTC-1. A layer of the adhesive is applied at 50 g/m$^2$ to a PET film 25 mm thick to give an adhesive sheet.

A strip of this adhesive sheet 2 cm wide is bonded to a steel plate by overrolling back and forth three times using a 2 kg roller. The plate is clamped in and the strip is pulled off via its free end in a tensile testing machine at a peel angle of 180° and a speed of 300 mm/min.

E. Outgassing

The highly volatile constituents were determined by GC-MS. Sample preparation was similar to that for test method F. The instruments used were as follows:

GC: Hewlett Packard HP 5890 SERIES 11
MS: Hewlett Packard HP 5989 A

For the purpose of measurement a DB-5 column with a length of 60 m, an internal diameter of 0.25 mm and a film thickness of 1 mm was installed. Measurement took place with a temperature programme of 50° C. (3 min)-150° C./min-260° C. (2 min). The carrier gas used was hydrogen (90 kPa) with a flow rate of 1 ml/min. The split ratio was 1:10.

The test is passed if the amount of volatiles does not exceed 2 000 mg/g.

F. Diesel Resistance

The adhesive was laminated by a transfer method at 50 g/m$^2$ onto a Maliwatt web. A strip of this specimen 2 cm wide is subsequently wound around a cable harness, composed of 10 cables and having a diameter of 10 mm, and stored at 120° C. for 48 hours. The cable harness is then bent into a U shape and immersed in the diesel fuel, with the end of the adhesive tape protruding from the fuel. The entire assembly is stored in the fuel for 5 minutes or for 24 h, after which the cable harness with the adhesive tape is removed, the diesel fuel is allowed to drip off for 2 minutes, and then the set of cables is bent around a mandrel having a diameter of 50 mm. The test is passed if there are no bags and folds, the adhesive does not detach, the adhesive does not become spongy and there is also no removal of colour.

EXAMPLES

Described below are examples of inventive adhesives and their preparation. The adhesives of the invention were used to produce adhesive sheets. The commercial products used are characterized by the manufacturer as follows:

| Manufacturer | Product name | Epoxy equivalents | Type |
|---|---|---|---|
| Vianova Resins | Beckopox EP 301 | 450-525 | Epoxy resin |
| Ciba Geigy | Irgacure ™651 | — | UV photo-initiator |

Example 1

A 2 l glass reactor conventional for radical polymerizations was charged with 40 g of acrylic acid, 260 g of 2-ethylhexyl acrylate and 266 g of acetone/special-boiling-point spirit 60/95 (2:1). After nitrogen gas had been passed through the reactor for 45 minutes with stirring the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis-(4-tert-butylcyclohexanyl) peroxydicarbonate (Perkadox 16™, Akzo Nobel) in solution in 10 g of acetone was added. After 6 hours the reaction mixture was diluted with 100 g of acetone. After a reaction time of 7 hours 0.8 g of bis-(4-tert-butylcyclohexanyl) peroxydicarbonate (Perkadox 16™, Akzo Nobel) in solution in 10 g of acetone was added. After 10 hours the reaction mixture was diluted with 150 g of acetone. After a reaction time of 24 h the reaction was terminated and the product cooled to room temperature. The resulting polyacrylate was subsequently blended with 0.4 g of Irgacure 651 and diluted to a solids content of 30% with methyl ethyl ketone and then 40 g of Beckopox™ EP 301 from Vianova Resins were added. The solution was then coated onto a PET film to give an adhesive sheet. After drying for 30 minutes at 90° C. the coatweight was 50 g/m$^2$.

UV curing was carried out using a UV unit from Eltosch. The unit is equipped with an Hg-doped UV lamp. The lamp intensity is 200 W/cm. The adhesive sheet for crosslinking was passed through the unit at 10 m/min, with irradiation taking place in a plurality of passes (6) in order to increase the radiation dose per specimen.

The technical adhesive properties were analysed by conducting test methods D, E and F.

Example 2

A 2 l glass reactor conventional for radical polymerizations was charged with 40 g of acrylic acid, 240 g of butyl acrylate, 80 g of tert-butyl acrylate, 40 g of methyl methacrylate and 200 g of acetone/special-boiling-point spirit 60/95 (2:1). After nitrogen gas had been passed through the reactor for 45 minutes with stirring the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis-(4-tert-butylcyclohexanyl) peroxydicarbonate (Perkadox 16™, Akzo Nobel) in solution in 10 g of acetone was added. After 6 hours the reaction mixture was diluted with 100 g of acetone. After a reaction time of 7 hours 0.8 g of bis-(4-tert-butylcyclohexanyl) peroxydicarbonate (Perkadox 16™, Akzo Nobel) in solution in 10 g of acetone was added. After 10 hours the reaction mixture was diluted with 150 g of acetone. After a reaction time of 24 h the reaction was terminated and the product cooled to room temperature. The resulting polyacrylate was subsequently blended with 0.4 g of Irgacure 651 and diluted to a solids content of 30% with methyl ethyl ketone and then 60 g of Beckopox™ EP 301 from Vianova Resins were added. The solution was then coated onto a PET film to give an adhesive sheet. After drying for 30 minutes at 90° C. the coatweight was 50 g/m$^2$.

UV curing was carried out using a UV unit from Eltosch. The unit is equipped with an Hg-doped UV lamp. The lamp intensity is 200 W/cm. The adhesive sheet for crosslinking was passed through the unit at 10 m/min, with irradiation taking place in a plurality of passes (6) in order to increase the radiation dose per specimen.

The technical adhesive properties were analysed by conducting test methods A, B and C.

Example 3

A 2 l glass reactor conventional for radical polymerizations was charged with 40 g of acrylic acid, 240 g of butyl acrylate, 80 g of tert-butyl acrylate, 40 g of methyl methacrylate and 200 g of acetone/special-boiling-point spirit 60/95 (2:1). After nitrogen gas had been passed through the reactor for 45 minutes with stirring the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis-(4-tert-butylcyclohexanyl) peroxydicarbonate (Perkadox 16™, Akzo Nobel) in solution in 10 g of acetone was added. After 6 hours the reaction mixture was diluted with 100 g of acetone. After a reaction time of 7 hours 0.8 g of bis-(4-tert-butylcyclohexanyl) peroxydicarbonate (Perkadox 16™, Akzo Nobel) in solution in 10 g of acetone was added. After 10 hours the reaction mixture was diluted with 150 g of acetone. After a reaction time of 24 h the reaction was terminated and the product cooled to room temperature. The polyacrylate was diluted to a solids content of 30% with methyl ethyl ketone and then 40 g of Beckopox™ EP 301 from Vianova Resins were added. The solution was then coated onto a PET film to give an adhesive sheet. After drying for 30 minutes at 90° C. the coatweight was 50 g/m².

The technical adhesive properties were analysed by conducting test methods A, B and C.

Example 4

A 2 l glass reactor conventional for radical polymerizations was charged with 40 g of acrylic acid, 240 g of 2-ethylhexyl acrylate, 40 g of tert-butyl acrylate, 20 g of acrylonitrile, 60 g of methyl methacrylate and 200 g of acetone/special-boiling-point spirit 60/95 (2:1). After nitrogen gas had been passed through the reactor for 45 minutes with stirring the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis-(4-tert-butylcyclohexanyl) peroxydicarbonate (Perkadox 16™, Akzo Nobel) in solution in 10 g of acetone was added. After 6 hours the reaction mixture was diluted with 100 g of acetone. After a reaction time of 7 hours 0.8 g of bis-(4-tert-butylcyclohexanyl) peroxydicarbonate (Perkadox 16™, Akzo Nobel) in solution in 10 g of acetone was added. After 10 hours the reaction mixture was diluted with 150 g of acetone. After a reaction time of 24 h the reaction was terminated and the product cooled to room temperature. The polyacrylate was diluted to a solids content of 30% with methyl ethyl ketone and then 40 g of Beckopox™ EP 301 from Vianova Resins were added. The solution was then coated onto a PET film to give an adhesive sheet. After drying for 30 minutes at 90° C. the coatweight was 50 g/m².

The technical adhesive properties were analysed by conducting test methods A, B and C.

REFERENCE EXAMPLE

The reference example used was Pyralux® LF001 from DuPont with an adhesive sheet thickness of 25 mm.

Results

Example 1 is a pressure-sensitively adhesive system which is used, for example, with particular preference in the automotive sector. To determine the bond strength first of all test D was carried out. The bond strength according to test D was 6.9 N/cm. This value in turn confirms the PSA properties for Example 1. An analogous test was conducted with UV-acResin 258™ from BASF. This product is used very frequently in the automotive sector for bonding cable bandaging tapes. In this case the bond strength under identical conditions was 4.1 N/cm.

In a further test the diesel resistance of Example 1 was investigated. For that purpose Example 1 was coated onto release paper and then laminated onto a Maliwatt web, which is used as backing material for numerous adhesive cable bandaging tapes. Then test method F was conducted on this specimen. From Table 1 it is apparent that the specimen passed the diesel test and can therefore be classed as diesel-resistant.

TABLE 1

| Example 1 | Assessment | |
|---|---|---|
| | after 5 min | after 24 h |
| Bagging | no | no |
| Folding | no | no |
| Adhesive detachment | no | no |
| Sponginess | no | no |
| Colour removal | no | no |
| Overall assessment | diesel-resistant | |

For suitability as a PSA in the automotive sector a further factor of great importance is the outgassing, since carmakers wish to minimize the "new car odour" in the car. Consequently the outgassing of these PSA tapes was determined in addition. The outgassing behaviour cannot be equated with the fogging test (see, for example, DE 198 07 752), since in this case highly volatile constituents, which cause the odour, are detected. In the fogging test what are detected instead are constituents which are able to deposit on the screen and which originate, for example, from additions of resin. For testing, therefore, the outgassing behaviour was determined by means of head space GC. The measurements are depicted in Table 2.

TABLE 2

| Example | Volatiles [µg/g] |
|---|---|
| 1 | 124 |

The value measured is very low for a resin-blended composition and hence easily meets the requirements.

Example 1 demonstrates that the adhesive of the invention can be used very effectively for adhesive bonding in the automotive sector. As compared with the resin-blended PSAs employed the adhesives of the invention exhibit very good outgassing in relation to resin-blended acrylate PSAs. In relation to straight acrylates they exhibit improved tackiness.

A further application of the adhesives of the invention is their use as a heat-activable adhesive.

To assess the Examples 2 to 4 from a technical adhesives standpoint first of all the T-peel test with FPCB material was carried out. The corresponding measurements are listed in Table 3.

TABLE 3

|  | Test A/T-Peel Test [N/cm] |
| --- | --- |
| Example 2 | 7.3 |
| Example 3 | 7.8 |
| Example 4 | 9.6 |
| Reference example | 6.5 |

Table 3 reveals that with the Examples 1 to 3 very high bonding strengths were achieved after only 30 minutes' curing. Thus the values measured are above the value for the reference example.

Another criterion for the use of heat-activable adhesive sheets for bonding FPCBs is the solder bath resistance (test method B).

Table 4 reports the results for solder bath resistance.

TABLE 4

|  | Test B/solder bath resistance |
| --- | --- |
| Example 2 | passed |
| Example 3 | passed |
| Example 4 | passed |
| Reference example | passed |

From the results it is evident that all of the examples are solder-bath-resistant and therefore meet the requirements of the FPCB industry.

A further criterion for use of a heat-activable adhesive sheet is the measurement of its stability under shear. Table 5 reports the corresponding values measured.

TABLE 5

|  | Test C/Bonding strength in N/mm$^2$ |
| --- | --- |
| Example 1 | 10.8 |
| Example 2 | 12.4 |
| Example 3 | 9.7 |
| Reference | 6.0 |

From Table 5 it is apparent that the adhesive sheets described in this invention possess a significantly higher bonding strength than the reference example.

The invention claimed is:

1. Adhesive comprising, based on the adhesive,
   (a) 50 to 95% by weight of a heat-activable or pressure-sensitively adhesive polymer formed from a comonomer mixture consisting essentially of, based on the polymer,
   (a1) 40 to 94% by weight of acrylic and/or methacrylic esters of the formula $CH_2=CH(R_1)(COOR_2)$, where $R_1$ is H or $CH_3$ and $R_2$ is H or alkyl chains having 1 to 30 carbon atoms;
   (a2) 5 to 30% by weight of a first copolymerizable vinyl monomer containing at least one carboxylic and/or sulphonic and/or phosphonic acid group;
   (a3) 1 to 10% by weight of a second copolymerizable vinyl monomer containing at least one epoxy group or one acid anhydride function; and
   (a4) 0 to 20% by weight of a third copolymerizable vinyl monomer containing at least one functional group which differs from the functional group of the first copolymerizable vinyl monomer and from the functional group of the second copolymerizable vinyl monomer; and also
   (b) 5 to 50% by weight of an epoxy resin or a mixture of two or more epoxy resins.

2. Adhesive according to claim 1, wherein component (a1) is an acrylic or methacrylic ester with an alkyl group containing 4 to 9 carbon atoms.

3. Adhesive according to claim 1 wherein component (a1) is selected from the group consisting of n-butyl acrylate, n-pentyl acrylate, n-hexyl acrylate, n-heptyl acrylate, n-octyl acrylate, n-nonyl acrylate, lauryl acrylate, stearyl acrylate and behenyl acrylate.

4. Adhesive according to claim 1, wherein the component (a2) is selected from the group consisting of itaconic acid, acrylic acid, methacrylic acid, vinylacetic acid, fumaric acid, crotonic acid, aconitic acid, dimethylacrylic acid, β-acryloyloxypropionic acid, trichioroacrylic acid, vinyiphosphonic acid and vinylsuiphonic acid.

5. Adhesive according to claim 1, wherein component (a3) is selected from the group consisting of glycidyl methacrylate, maleic an hydride and itaconic an hydride.

6. Adhesive according to claim 1, wherein component (a4) is selected from the group consisting of vinyl esters, vinyl ethers, vinyl halides, vinylidene halides and vinyl compounds containing aromatic rings and heterocycles in αposition.

7. Adhesive according to claim 1, wherein component (a4) is selected from the group consisting of vinyl acetate, vinylformamide, vinylpyridine, ethyl vinyl ether, vinyl chloride, vinylidene chloride and acrylonitrile.

8. Adhesive according to claim 1, wherein component (b) is an epoxy resin containing at least two epoxy groups.

9. Adhesive according to claim 1, wherein component (b) is an epoxy resin having a molecular weight of 100 g/mol to 25 000 g/mol.

10. Adhesive tape comprising the adhesive of claim 1.

11. Adhesive tape according to claim 10, where the adhesive tape is coated on one or both sides with the adhesive.

12. Adhesive tape according to claim 11, where the adhesive is crosslinked by means of UV radiation or electron beams.

* * * * *